June 26, 1962 W. C. SEALEY 3,041,560
DISTRIBUTION VOLTAGE REGULATOR
Filed June 21, 1960
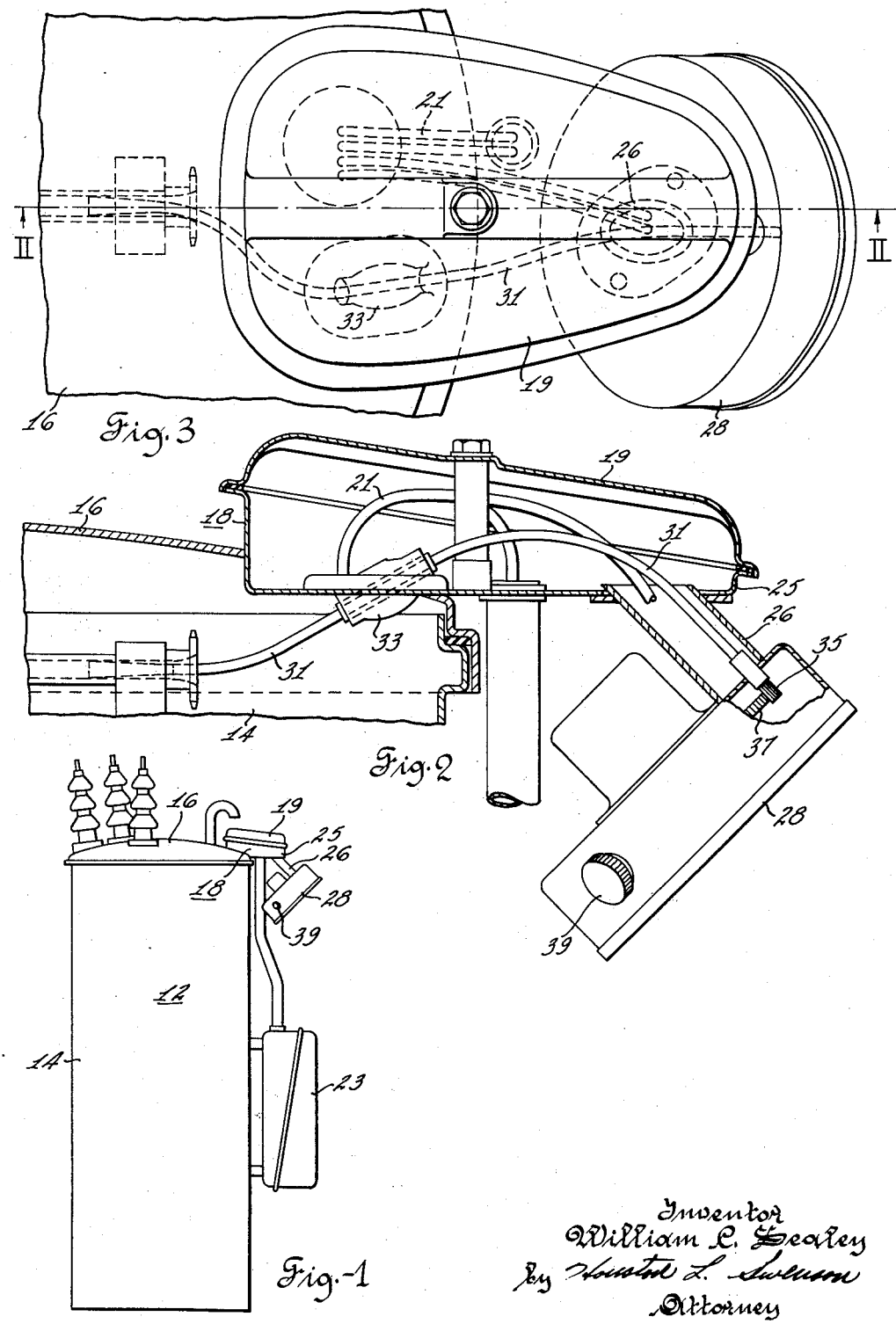
Inventor
William C. Sealey
by Houston L. Swenson
Attorney

United States Patent Office 3,041,560
Patented June 26, 1962

3,041,560
DISTRIBUTION VOLTAGE REGULATOR
William C. Sealey, Milwaukee, Wis., assignor to Allis-Chalmers Manufacturing Company, Milwaukee, Wis.
Filed June 21, 1960, Ser. No. 37,644
8 Claims. (Cl. 336—45)

This invention relates to distribution voltage regulators and in particular to the combination of a voltage regulator and position indicator.

Distribution regulators are generally of a load tap changing variety. A mechanical tap changer selects various portions of a tapped winding of a transformer in order to regulate the line voltage. These tap changing mechanisms generally have thirty-two steps and are capable of operating over a range of plus or minus ten percent of the voltage output. Thus, the tap changer has sixteen steps on the raise side and sixteen steps on the lower side. It has been well recognized that a voltage regulator may operate at greater than nameplate current provided the range of its regulation is reduced. Consequently, regulators have been provided with means for varying this range of operation to as low as plus or minus five percent. The control means for varying this range of regulation has generally been incorporated in a position indicator. The function of the position indicator is to determine the maximum and minimum points at which the regulator has operated over a given period. It is particularly useful in indicating the load requirements of the regulator. If the maximum and minimum pointers of the indicator show that for a period of time the regulator operated over only a small fraction of its set range it would appear that a lesser range of operation is permissible, thereby enabling the regulator to operate at a greater than nameplate current.

To use this feature, utilities make periodic inspections of their distribution regulators in order to determine the range of operation of the regultors. Quite frequently these regulators are mounted in elevated positions on poles and, consequently, the position indicators which are externally mounted on the regulators should be easily visible from ground level. To comply with the safety rules of many utilities these position indicators must be mounted below the cover line of the regulators. This permits a person to adjust the range of the regulator without rising to the level of the high voltage bushings, thereby minimizing the posibility of being injured.

In the prior art these position indicators have usually been mounted on the wall of the regulator tank with the drive mechanism for the position indicator being brought out through the tank wall. For early designs of regulators this was of only slight disadvantage since the regulators were not cover mounted and the position indicator connections could be made while the cover was off. However, in recent years the construction of regulators has been improved by mounting the core, coils and tap changing mechanism onto the underneath side of the regulator cover. This permits ease in manufacturing the unit and maintaining it in the field since the regulator can be untanked as a unit. To further this advantage of unit construction, the control leads of the regulator were brought out through the tank cover where they could be easily disconnected from the regulator control box which was mounted on the side of the tank. Eventually, the control box was suspended from the cover so that the regulator including its control unit could be untanked as a unit. In such a manner, all of the electrical connections could be made with the regulator out of the tank and thus were not disturbed when the core and coils were placed in the regulator tank. However, in view of the general requirement that the position indicator be located below the level of the cover it was still necessary to uncouple the driving shaft mounted between the tap changing mechanism and the position indicator mounted on the tank wall.

For a number of years, the desirability of making a regulator entirely of unit construction so that no connection of any kind is required when the regulator is tanked or untanked has been well recognized. The invention described herein provides a readily acceptable unit construction regulator which is in full compliance with the safety regulations of utilities. The invention comprises a unique arrangement of the position indicator mounted in such a manner as to be readily visible from ground level and still mounted on and beneath the tank cover to provide a unit construction regulator.

It is therefore an object of the present invention to provide a new and improved load tap changing regulator.

Another object of the present invention is to provide a new and improved regulator having a position indicator that is readily observed and reset.

A further object of the present invention is to provide a new and improved regulator of full unit construction.

Objects and advantages other than those mentioned above will be apparent from the following description when read in connection with the drawing in which:

FIG. 1 is a side elevation of the regulator and position indicator;

FIG. 2 is an enlarged cross sectional view taken generally along lines II—II of FIG. 3; and FIG. 3 is a top view of FIG. 2.

Referring to the drawings, FIG. 1 illustrates a distribution regulator 12 having a cylindrical tank 14 with a cover 16 which encloses a conventional regulator unit (not shown). The invention is equally applicable to the larger station type distribution regulators with rectangular tanks. Mounted on top of the cover 16 is a terminal box 18 and a terminal box cover 19 through which a number of conductors 21 pass and are connected to the regulator unit and a control panel 23. An end portion 25 of the terminal box 18 extends past the periphery of the tank cover 16. Connected to the underneath side of this end portion is an oblique conduit 26 which supports a position indicator 28 in an inclined fashion whereby it is easily read from ground level. The position indicator is a conventional type in that it has a pair of maximum and minimum drag pointers and an instantaneous pointer (not shown).

Referring to FIG. 2, a flexible shaft 31 passes through the conduit 26 into the terminal box 18 and down through the top of the tank cover into the tank where it is coupled in a conventional manner to the tap changing mechanism. Inasmuch as the regulator probably contains oil, it is essential that the point at which the cable passes through the cover is sealed tight. This may be accomplished by a sealing means such as a grease seal 33 which permits the shaft to freely rotate. An O-ring seal or a stuffing box arrangement is also satisfactory for this purpose, but these are more likely to bind with the shaft. Secured to the end of the rotatably mounted shaft 31 is a spur gear 35 through which the shaft drives a disk gear 37 coupled to the instantaneous pointer of the position indicator. With the use of a spur gear, a single gear reduction means is obtained which provides for mounting the position indicator on the under side of the cover and in an inclined position.

Through the above described novel arrangement a one hundred percent unit construction regulator is obtained which results in superior manufacture and low cost untanking in the field. In installation and maintenance work the cover of the tank need merely be unbolted and raised upwardly thereby lifting the entire regulator unit including the position indicator. Since there is no need to disconnect any of the mechanical or electrical parts, an easy inspection is thereby possible. In addition, the position indicator is readily observable by persons at lower levels.

Its controls may be adjusted through knob 39 by a utility man who need have no fear of getting any parts of his body above the cover of the regulator where the high voltage bushings are mounted.

While only one embodiment of the present invention has been illustrated and described, it will be apparent to those skilled in the art that modifications other than those shown may be made without departing from the spirit of the invention or from the scope of the appended claims.

Having now particularly described and ascertained the nature of my said invention and the manner in which it is to be performed, I declare that what I claim is:

1. A tap changing regulator comprising in combination: a transformer coupled to a tap changing mechanism; a tank and cover enclosing said transformer and tap changing mechanism; a terminal box mounted on the top of said tank cover; a conduit mounted on said terminal box exterior to said tank and terminating beneath the top of said cover; a position indicator mounted on the end of said conduit; and a flexible cable rotatably connected to said tap changing mechanism and said position indicator, said cable extending through said cover, into said terminal box and through said conduit.

2. A tap changing regulator comprising in combination: a transformer coupled to a tap changing mechanism; a tank and cover enclosing said transformer and tap changing mechanism; a terminal box mounted on the top of said tank cover with an end portion overhanging said tank; a position indicator mounted on the underneath side of said end portion and having an indexed plate inclined toward a point below said tank; and a flexible cable rotatably connected to said tap changing mechanism and said position indicator, said cable extending through and in sealing relationship with said cover, into said terminal box.

3. A tap changing regulator comprising in combination: a transformer coupled to a tap changing mechanism; a tank and cover enclosing said transformer and tap changing mechanism; a terminal box mounted on the top of said tank cover with an end portion overhanging said tank; a conduit connected to said end portion and terminating beneath the top of said cover; a position indicator mounted on the end of said conduit and having its face inclined toward a point below said tank; and a flexible cable rotatably connected to said tap changing mechanism and said position indicator, said cable extending through and in sealing relationship with said cover, into said terminal box and through said conduit.

4. A tap changing regulator comprising in combination: a transformer coupled to a tap changing mechanism; a tank and cover enclosing said transformer and tap changing mechanism, said cover having an aperture defined by a sealing means; a terminal box mounted on the top of said tank cover over said sealing means; a conduit mounted on said terminal box exterior to said tank and terminating beneath the top of said cover; a position indicator mounted on the end of said conduit and having its face inclined toward a point below said tank; and a flexible cable rotatably connected to said tap changing mechanism and said position indicator, said cable extending through said sealing means, into said terminal box and through said conduit.

5. A tap changing regulator comprising in combination: a transformer coupled to a tap changing mechanism; a tank and cover enclosing said transformer and tap changing mechanism, said cover having an aperture defined by a sealing means; a terminal box mounted on the top of said tank cover over said sealing means; a conduit mounted on the bottom of said terminal box exterior to said tank and terminating beneath the top of said cover; a position indicator mounted on the end of said conduit and having its face inclined toward a point below said tank and a disk gear parallel to said indexed plate in driving connection with a pointer; and a flexible cable having one end rotatably connected to said tap changing mechanism with the other end having a spur gear engaged with said disk gear, said cable extending through said sealing means, into said terminal box and through said conduit.

6. A tap changing regulator comprising in combination: a transformer coupled to a tap changing mechanism, a tank and cover enclosing said transformer and tap changing mechanism, said cover having an aperture defined by a sealing means; a terminal box mounted on the top of said tank cover with an end portion overhanging said tank; said position indicator mounted on the underneath side of said end portion and having an indexed plate inclined toward a point below said tank and a disk gear parallel to said indexed plate in driving connection with a pointer and a flexible cable having one end rotatably connected to said tap changing mechanism with the other end having a spur gear engaged with said disk gear; said cable extending through said sealing means, into said terminal box and through said conduit.

7. A tap changing regulator comprising in combination: a transformer coupled to a tap changing mechanism, a tank and cover enclosing said transformer and tap changing mechanism, said cover having an aperture defined by a sealing means; a terminal box mounted on the top of said tank cover with an end portion overhanging said tank; a conduit connected to said end portion and terminating beneath the top of said cover; said position indicator mounted on the end of said conduit and having its face inclined toward a point below said tank and a disk gear parallel to said indexed plate in driving connection with a pointer; and a flexible cable having one end rotatably connected to said tap changing mechanism with the other end having a spur gear engaged with said disk gear; said cable extending through said sealing means, into said terminal box and through said conduit.

8. A tap changing regulator comprising in combination: a transformer coupled to a tap changing mechanism; a tank and cover enclosing said transformer and tap changing mechanism; a terminal box mounted on the top of said tank cover; a position indicator connected to a portion of said terminal box and having an indexed plate positioned below the level of said cover; and a flexible cable rotatably connected to said tap changing mechanism and said position indicator, said cable extending through said cover and said terminal box.

References Cited in the file of this patent
UNITED STATES PATENTS

| | | |
|---|---|---|
| 1,709,724 | Hill | Apr. 16, 1929 |
| 2,457,372 | Hobart | Dec. 28, 1948 |